July 16, 1957        E. J. VOGEL        2,799,769
SHIELDING GAS SUPPLY ASSEMBLY FOR ARC WELDING TORCH
Filed Sept. 26, 1955        2 Sheets-Sheet 1
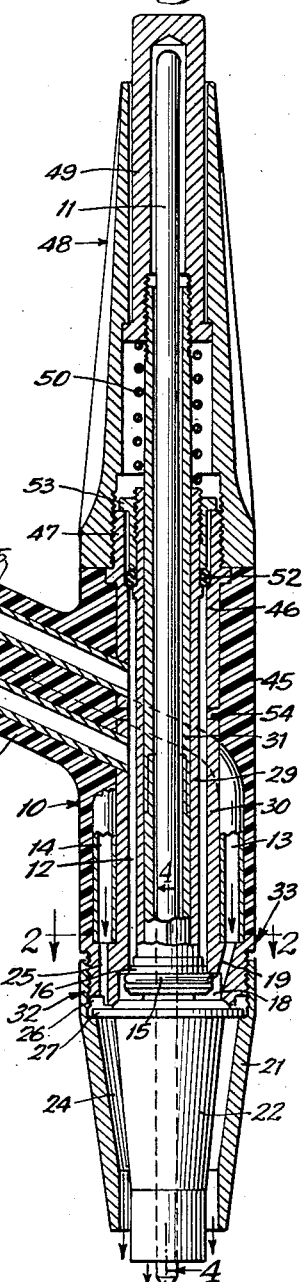
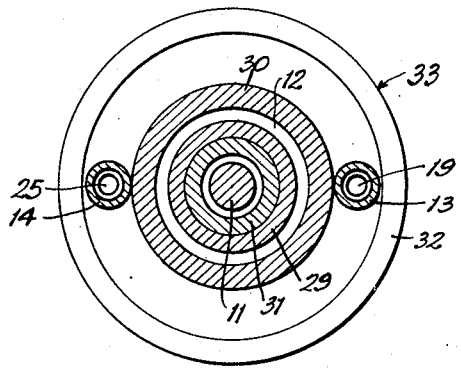
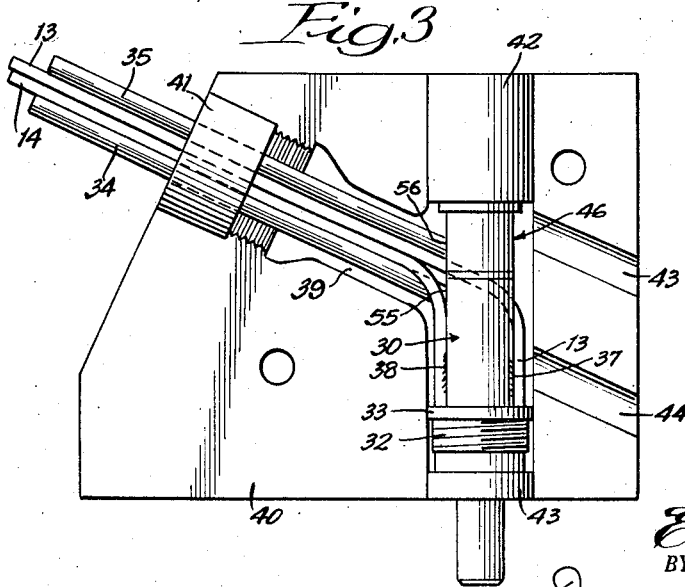
INVENTOR:
Edward J. Vogel,
BY
Dawson, Tilton & Graham
ATTORNEYS

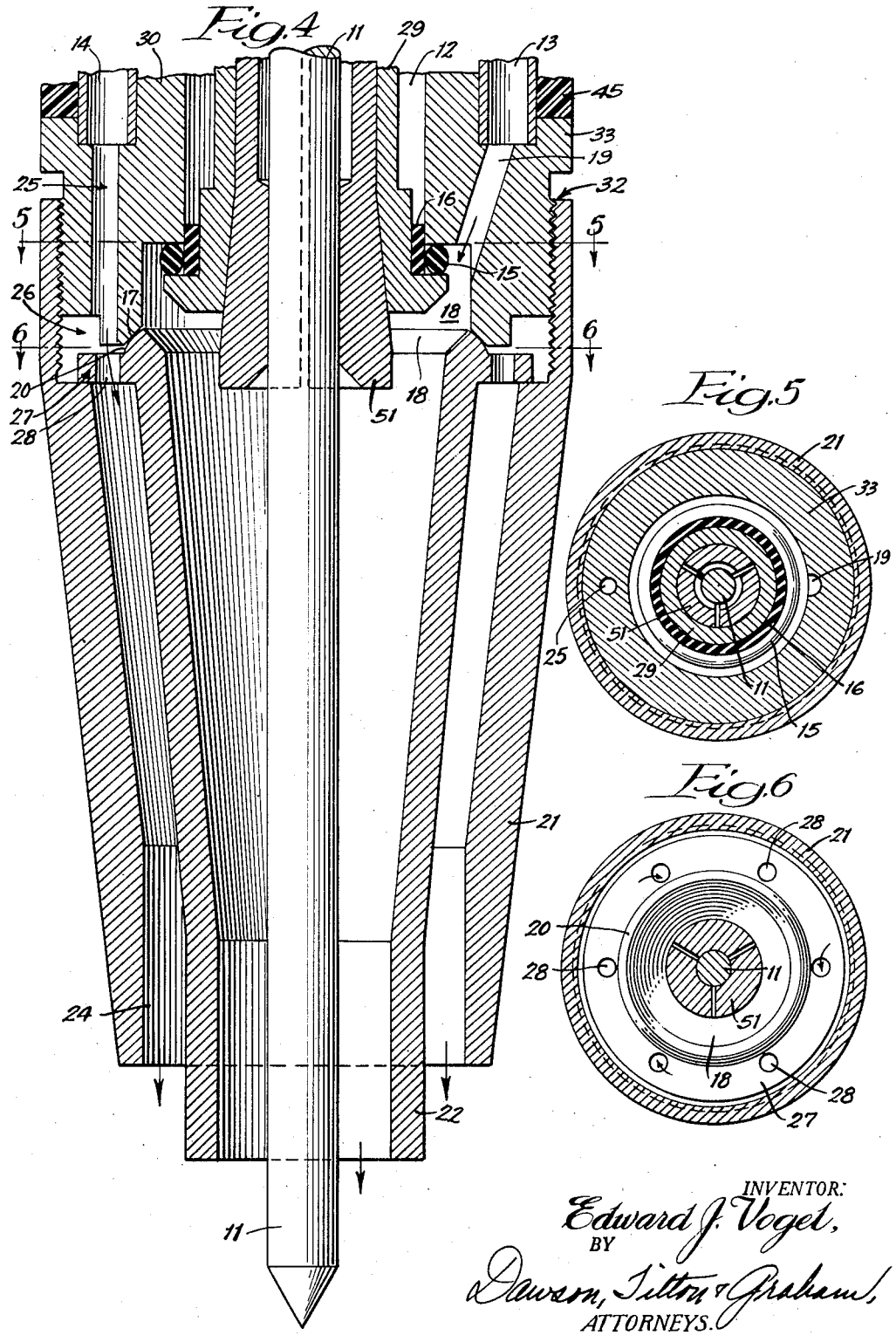

United States Patent Office 2,799,769
Patented July 16, 1957

2,799,769
SHIELDING GAS SUPPLY ASSEMBLY FOR ARC WELDING TORCH

Edward J. Vogel, Chicago, Ill., assignor to The Liquid Carbonic Corporation, Chicago, Ill., a corporation of Delaware Application September 26, 1955, Serial No. 536,357

7 Claims. (Cl. 219—75)

This invention relates to a shielding gas assembly for an arc welding torch. More particularly, it is concerned with an assembly or combination of elements which are especially adapted for use in an arc welding torch employing a non-depositing electrode.

Arc welding torches equipped with a non-depositing electrode and employing shielding gas have been in commercial use for some years. The design of such torches, however, has presented a number of problems which heretofore have not been satisfactorily solved. These problems relate particularly to the arrangement and location of the gas supply passage around the internal water cooling jacket, water cooling having been found to be almost indispensable for this type of torch. These problems have become even more difficult of solution for the specific type of torch described in my copending application, Serial No. 485,975, filed February 3, 1955, of which the present application is a continuation-in-part. With the type of torch described in my prior application, the gas supply problem is more difficult, because it is necessary to supply two shielding gases, rather than a single shielding gas, as was the prior commercial practice. These gases must be kept separate from each other and from the water in the cooling jacket. The accomplishment of this result would ordinarily be expected to require a number of internal seals in the torch, which would increase the complexity of the torch, and also the number of expendable parts which must be replaced at frequent intervals.

It is therefore a general object of this invention to provide an arc welding torch having a shielding gas supply assembly which is adapted for use with two shielding gases and internal water cooling jacket without at the same time requiring a large number of internal seals for unduly increasing the complexity of the torch. It is also an object to provide an assembly of the character described which is readily adapted for commercial manufacture and provides considerable simplifications over prior manufacturing procedures. Further objects and advantages will become apparent as the specification proceeds.

This invention is shown in illustrative embodiment in the accompanying drawing, in which—

Figure 1 is a vertical sectional view of an arc welding torch embodying the present invention; Fig. 2, a cross-sectional view taken on line 2—2 of Fig. 1; Fig. 3, a view of the partially assembled structure as it would appear in manufacturing the torch of Figs. 1 and 2, the partial assembly being seated in one-half of a mold; Fig. 4, a partial enlarged sectional view taken on line 4—4 of Fig. 1; and Figs. 5 and 6, cross-sectional views taken respectively on lines 5—5 and 6—6 of Fig. 4.

Looking first at Fig. 1, there is shown a welding torch having a torch body 10 adapted to receive an electrode 11 with the electrode normally projecting outwardly from the forward end of body 10. Electrode 11 is preferably of the non-depositing type, and may be formed of tungsten or a tungsten alloy. Body 10 provides a water passage 12 and gas passages 13 and 14 which extend to points adjacent its forward end. A tubular gasket 16 and O-ring 15 are mounted on the forward end of body 10 and disposed across the forward end of water passage 12, the O-ring being outside of the gasket.

Preferably as shown, water passage 12, O-ring 15 and gasket 16 are annular. Annular gasket 16 centers the assembly of electrode 11 within collet 31, within quill 29 with reference to torch body front insert 30. Inner gas supply conduit 13 communicates with bore 19 and this gas then expands into annular chamber 18 surrounding front electrode assembly and passes through inner nozzle 22 to the atmosphere. Outer gas tube 14 communicates with bore 25 so gas may enter into annular space 26. Outer gas then travels through multiple holes 28 in external annular flange 27 of inner nozzle 22. Outer gas is free to expand through annular passage 24 and finally to atmosphere as indicated by arrows. Outer gas thus envelops inner gas, which is expanding in an annular pattern around projecting electrode 11. Inner gas expanding into chamber 18 and outer gas expanding into annular space 26 are prevented from mixing with each other by the contact between convex annular segment 20 on extremity of inner nozzle, and female conical surface 17 on extremity of enlarged portion 33 of front torch insert 30. Contact between spherical segment 20 of inner nozzle and female conical surface 17 is maintained by the threaded engagement of thread 32 of outer nozzle 21 and thread 32 of enlarged extension 33. Inner shoulder of outer nozzle bears against annular outer flange 27 of inner nozzle 22.

As shown in Fig. 1, the projecting portion of electrode 11 is enclosed by a pair of concentric nozzles 21 and 22. Both nozzles are mounted on the forward end of torch body 10 for partially enclosing the projecting portion of electrode 11. In the illustration given, conduit 14 communicates with an annular gas collection space 26.

The torch body 10 is generally tubular having a longitudinal axis along which electrode 11 is received. Concentric with this axis there are provided two spaced metal sleeves 29 and 30. Inner sleeve 29 functions as a quill to slidably receive the electrode gripping collet 31. The outer sleeve 30 is designed principally to enclose the cooling water space 12 and thereby provide a water cooling jacket about electrode 11. In the illustration given, the forward end portion of outer sleeve 30 is enlarged and provided with threads at 32 for threadedly receiving outer nozzle 21. It is also provided with an enlarged annular shoulder 33 into which extend the forward ends of gas conduits 13 and 14. Gas passages 19 and 25 comprise bores through the enlarged forward end of sleeve 30.

Water inlet conduit 34 and water outlet conduit 35 extend laterally from body 10 within torch handle 36. Both of these conduits communicate with water cooling space 12. The gas inlet conduits 13 and 14 run beside the water conduits 34 and 35 through handle 36 down to outer sleeve 30 and then along the outside wall of sleeve 30 to points adjacent the forward end of body 10, more specifically, to annular shoulder 33.

The preferred method for forming the handle portion 36 and the bottom portion 10 of the torch is shown in Fig. 3. The assembly of sleeve 30 and sleeve 46 with the water conduits, 34, 35 respectively and the gas conduits 13, 14 is shown as it would appear in preparation for a molding operation. The gas conduits have been brazed to the outside of sleeve 30, as indicated at 37, 38. Also, the water conduits 34, 35 have been respectively brazed to sleeve inserts 30 and 46 as indicated at 55, 56. The whole assembly is then placed within a suitably shaped mold cavity 39, one-half of which is provided within a die block 40. End closures for the mold cavity are provided, closures 41, 42 and 43 being shown in the drawing. Then when the other die block is secured in place, a plastic molding material can be introduced through mold inlets 43, 44. The result will be to embed the water and gas conduits within an exterior covering 45, as indicated more clearly in Fig. 1 of the drawing. The specific plastic molding material is not critical, good results being obtained with standard commercial materials such as Bakelite, hard rubber, etc.

The other elements shown in the drawing which have not as yet been described do not relate particularly to the subject matter of this invention, and therefore will be only briefly mentioned herein. They include insert sleeves 30 and 46, of which 46 is provided with a threaded end portion 47 for receiving the body tail or cap element 48. A plunger 49 is slidably mounted in the rear end of body tail 48, being urged rearwardly by compression spring 50. Plunger 49 is threadedly connected to collet 31 so that upon depression of the plunger 49 collet 31 is moved forwardly, thereby releasing electrode 11 from the gripping fingers 51. This permits ready adjustments to be made. The means for adjusting electrode 11 are described more fully in my cited copending application, Serial No. 485,975.

Operation

In the operation of the device shown in the drawing, cooling water is supplied through conduit 34 to water cooling chamber 12 and removed through water outlet conduit 35. The escape of water from the ends of cooling chamber 12 is prevented respectively by annular gasket 16 and a compressible sealing ring (O-ring) 15 at the lower end, and by O-ring 52 at the upper end of the chamber. The electric current supplied to the metal walls of water outlet conduit 35, is applied to electrode 11 through outer sleeve 46, intermediate sleeve 53, quill 29, and collet 31. The current is prevented from passing from sleeve 46 to sleeve 30 because of the gap therebetween which is filled with the electrically insulating plastic material at 54.

The inner shielding gas, which may be any inert gas such as argon or helium, is supplied under pressure to conduit 13 along the outer side of sleeve 30, then to passage 19 and into the annular gas space 18. From there it expands within inner nozzle 22. Similarly, the outer shielding gas, which may be a gas such as carbon dioxide or nitrogen, is supplied under pressure through conduit 14, passed along the outside of sleeve 30, then through passage 25 into annular gas collection space 26. From gas collection space 26 the outer shielding gas is diffused through perforations 28 into the annular space 24 between nozzles 21 and 22. In this way, both shielding gases are evenly distributed into two concentric envelopes which issue from the ends of the nozzles and effectively shield the welding zone from the atmosphere.

Upon consideration, it can be seen that O-ring 15 and annular gasket 16 can perform and do perform a number of important functions. To maximize the desirable results, it is preferred that gasket 16 be constructed of a material which is both thermally and electrically insulating. For example, it can be formed of a heat resistant plastic such as the tetrafluoroethylene plastics sold under the trade name of Teflon. With this construction, O-ring 15 and annular gasket 16 effectively insulate the nozzles 21 and 22 from the electrically charged collet 31 and quill 29. This, of course, is in addition to the function they perform as a lower end seal for water cooling chamber 12 and the other functions already described.

While in the foregoing specification this invention has been described in relation to a specific embodiment thereof, it will be apparent to those skilled in the art that the invention is susceptible to other embodiments, and that many of the details described herein can be varied considerably without departing from the basic concepts of the invention.

I claim:

1. In an arc welding torch having a torch body adapted to receive an electrode with the electrode normally projecting outwardly from the forward end of said body, said body providing a water passage and a gas passage extending to points adjacent its forward end, a gasket and an O-ring mounted on the forward end of said body and disposed across the forward end of said water passage for sealing said water passage and separating it from said gas passage, said O-ring being arranged outwardly of said gasket.

2. The combination of claim 1 in which said water passage forward end, said gasket, and said O-ring are annular, and an annular gas collection space is provided in communication with said gas passage.

3. The combination of claim 2 in which said gasket and O-ring are formed of an electrically insulating material, and in which there is also provided at least one nozzle mounted on the forward end of said torch body for partially enclosing said electrode projecting portion, the inner end of said nozzle communicating with said annular gas collection space.

4. In an arc welding torch having a torch body adapted to receive an electrode along the longitudinal axis of said body with the electrode normally projecting outwardly from the forward end of said body, spaced axially-concentric metal sleeves within said body providing a water cooling chamber therebetween, water inlet and outlet conduits extending laterally from said torch body and being arranged to communicate with said water cooling chamber, a pair of gas inlet conduits running beside said water conduits down to the outside wall of said sleeves and then along the outside wall of said outer sleeve to points adjacent the forward end of said body, a pair of spaced axially-concentric nozzles mounted on the forward end of said torch body, and passage means providing separate direction connections from the forward ends of said gas conduits respectively into the space within the inner of said nozzles and the space between said nozzles.

5. The combination of claim 4 in which said gas inlet conduits are attached to said outside wall of said outer sleeve, and in which a layer of plastic molding material is disposed around said outer sleeve to provide the outer covering for said torch body, said gas conduits being embedded in said layer.

6. In an arc welding torch having a tubular body adapted to receive an electrode with the electrode normally projecting outwardly from the forward end of said body, means within said body for supportably-receiving said electrode including an outer metal sleeve, a second metal sleeve mounted within said body in generally concentric relation to said first sleeve and at an outwardly spaced distance therefrom to provide a water cooling passage between said sleeves, and an O-ring and tubular gasket of insulating materials disposed between the forward end portions of said sleeves for sealing said passage, said gasket extending inwardly between the walls of said sleeves, thereby spacing and centering said first sleeve with respect to said second sleeve, and said O-ring being arranged around the outer end portion of said gasket.

7. In an arc welding torch having a torch body adapted to receive an electrode along the longitudinal axis of said body with the electrode normally projecting outwardly from the forward end of said body, said body providing an externally-threaded mounting ring on the forward end portion thereof with two separate gas passages extending longitudinally therethrough and a pair of spaced axially-concentric nozzles mounted on said mounting ring, the space within the inner of said nozzles communicating with one of said gas passages and the space between said nozzles communicating with the other of said gas passages, the outer nozzle being threadedly connected to the externally-threaded portion of said mounting ring, and clamping the inner nozzle against the forward end of said ring, one of the contacting surfaces between said ring and said inner nozzle being a convex annular surface and the other surface being a mating conical surface.

References Cited in the file of this patent

UNITED STATES PATENTS 2,468,804     Breymeier _____ May 3, 1949
2,686,860     Buck et al. _____ Aug. 17, 1954